US011012997B2

(12) United States Patent
Li et al.

(10) Patent No.: US 11,012,997 B2
(45) Date of Patent: May 18, 2021

(54) SUBFRAME CONFIGURATION METHOD AND APPARATUS

(71) Applicant: HUAWEI TECHNOLOGIES CO., LTD., Guangdong (CN)

(72) Inventors: Zhongfeng Li, Munich (DE); Yongzhao Cao, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/171,919

(22) Filed: Oct. 26, 2018

(65) Prior Publication Data

US 2019/0069293 A1 Feb. 28, 2019

Related U.S. Application Data

(63) Continuation of application No. PCT/CN2017/081050, filed on Apr. 19, 2017.

(30) Foreign Application Priority Data

Apr. 29, 2016 (CN) .......................... 201610289638.0

(51) Int. Cl.
*H04J 3/00* (2006.01)
*H04W 72/04* (2009.01)
*H04W 74/00* (2009.01)
*H04L 5/14* (2006.01)
*H04W 74/08* (2009.01)

(52) U.S. Cl.
CPC ........... *H04W 72/0446* (2013.01); *H04L 5/14* (2013.01); *H04W 72/042* (2013.01); *H04W 74/00* (2013.01); *H04W 74/0833* (2013.01)

(58) Field of Classification Search
CPC ............. H04W 74/00; H04W 74/0833; H04W 72/0446; H04L 5/14; H04L 5/1476; H04L 5/0055

See application file for complete search history.

(56) References Cited

U.S. PATENT DOCUMENTS 9,788,306 B2 * 10/2017 Chen .................... H04B 7/2656
2007/0064669 A1 3/2007 Classon et al.
(Continued)

FOREIGN PATENT DOCUMENTS

| CN | 103220812 A | 7/2013 |
| CN | 103975637 A | 8/2014 |

(Continued)

*Primary Examiner* — Abdelnabi O Musa (57) ABSTRACT

A method for communication between a base station and multiple terminal devices in a time division duplex (TDD) mode is disclosed. Prior to communicating with the multiple terminal devices by means of a plurality of frames, the base station performs semi-static configuration on a first group of subframes of the plurality of frames, by sending a system message to the multiple terminal devices, the system message carrying configuration information designating a first group of subframes in every frame of the plurality of frames as being of a first subframe type; for each frame in the plurality of frames, the base station sends downlink control information to a first terminal device of the multiple terminal devices, the downlink control information designating a second group of subframes in said each frame as being of a second subframe type.

8 Claims, 4 Drawing Sheets

(56) References Cited

U.S. PATENT DOCUMENTS

| | | |
|---|---|---|
| 2008/0219190 A1 | 9/2008 | Haartsen |
| 2010/0080139 A1 | 4/2010 | Palanki et al. |
| 2012/0033589 A1 | 2/2012 | Zheng |
| 2012/0093071 A1 | 4/2012 | Huang et al. |
| 2014/0313945 A1 | 10/2014 | Beale et al. |
| 2015/0117354 A1* | 4/2015 | Dai .................. H04W 72/042 370/329 |
| 2015/0156006 A1* | 6/2015 | Takano ................ H04L 5/0055 370/280 |
| 2015/0245247 A1* | 8/2015 | Chen ...................... H04L 5/14 370/280 |
| 2015/0250017 A1* | 9/2015 | Ingale ................ H04B 7/2615 370/280 |
| 2016/0014781 A1 | 1/2016 | Nagata et al. |
| 2016/0165591 A1* | 6/2016 | Li ............................ H04J 3/12 370/280 |
| 2016/0345199 A1* | 11/2016 | Nogami ................ H04W 76/27 |
| 2017/0303222 A1 | 10/2017 | Lee et al. |
| 2017/0303306 A1 | 10/2017 | Lee et al. |

FOREIGN PATENT DOCUMENTS

| | | |
|---|---|---|
| CN | 105517160 A | 4/2016 |
| KR | 20150060876 A | 6/2015 |
| RU | 2474053 C2 | 1/2013 |
| WO | 2006105005 A2 | 10/2006 |
| WO | 2014183008 A2 | 11/2014 |
| WO | 2014186456 A1 | 11/2014 |
| WO | 2016044004 A1 | 3/2016 |
| WO | 2016048100 A1 | 3/2016 |
| WO | 2016064196 A1 | 4/2016 |

* cited by examiner

SUBFRAME CONFIGURATION METHOD AND APPARATUS

CROSS-REFERENCE TO RELATED APPLICATIONS

This application is a continuation of International Application No. PCT/CN2017/081050, filed on Apr. 19, 2017, which claims priority to Chinese Patent Application No. 201610289638.0, filed on Apr. 29, 2016. The disclosures of the aforementioned applications are hereby incorporated by reference in their entireties.

TECHNICAL FIELD

The present application relates to the field of communications technologies, and in particular, to a subframe configuration method and apparatus.

BACKGROUND

Time division duplex (TDD) is a duplex communication technology in a mobile communication system. In a TDD system, uplink information and downlink information are transmitted at different times over a same frequency channel (namely, a carrier), and uplink and downlink channels are distinguished by time.

As a service scope expands and service flexibility increases, a communication system needs to support transmission of more types of service data. Therefore, the communication system needs to flexibly configure uplink and downlink subframes, to flexibly transmit uplink and downlink information. A TDD mode supports flexible configuration of uplink and downlink subframes. In the TDD mode, each subframe in a frame may be configured to a subframe of any type. According to different subframe types, one subframe may be an uplink subframe, a downlink subframe, a special subframe, or the like. In a special subframe, some symbols are used to transmit uplink data and some symbols are used to transmit downlink data.

In the TDD mode, a type of each subframe in a frame may be randomly set. Therefore, for two terminal devices, a subframe of one terminal device may be configured as an uplink subframe, and a subframe of the other terminal device may be configured as a downlink subframe. In this way, information that is transmitted by any one of the two terminal devices in the subframe, for example, common information, is greatly interfered with by information transmitted by the other terminal device in the subframe. The common information transmitted by one terminal device in the subframe may not be correctly received by a receive end. As a result, the receive end cannot use the common information for operating. For example, a subframe of a terminal device A may be configured as a downlink subframe, and a subframe of a terminal device B may be configured as an uplink subframe. In the subframe, the terminal device A may not receive downlink control information sent by a base station in the subframe because the terminal device B transmits uplink information in the subframe, and consequently, the terminal device A cannot normally access a network based on the downlink control information.

SUMMARY

Embodiments of the present application provide a subframe configuration method and apparatus, to resolve at least a problem that a receive end (a network device or a terminal device) cannot correctly receive common information, and cannot use the common information transmitted in a subframe for operating, because different terminal devices have opposite information transmission directions in a same subframe, and the common information that is transmitted by one terminal device in the subframe is interfered with by information transmitted in an opposite direction in the subframe by another terminal device.

To achieve the foregoing purpose, the following technical solutions are used in the embodiments of the present application.

A first aspect provides a subframe configuration method, applied to a TDD communication system. The method includes: sending, by a network device, a subframe configuration message to at least two terminal devices, where the subframe configuration message carries a subframe type of a first part of subframes in a target frame, and is used to instruct the at least two terminal devices to configure the subframe type of the first part of subframes in the target frame, so that the at least two terminal devices transmit information in a same direction in any subframe of the first part of subframes in the target frame; the same direction includes at least one of an uplink direction and a downlink direction; and the first part of subframes refer to specific subframes in a frame, and the first part of subframes in the target frame are used to transmit common information.

A second aspect provides a network device, applied to a TDD communication system. The network device includes: a sending unit, configured to send a subframe configuration message to at least two terminal devices, where the subframe configuration message carries a subframe type of a first part of subframes in a target frame, and is used to instruct the at least two terminal devices to configure the subframe type of the first part of subframes in the target frame, so that the at least two terminal devices transmit information in a same direction in any subframe of the first part of subframes in the target frame; the same direction includes at least one of an uplink direction and a downlink direction; and the first part of subframes refer to specific subframes in a frame, and the first part of subframes in the target frame are used to transmit common information.

A third aspect provides a subframe configuration method, applied to a TDD communication system. The method includes: receiving, by a terminal device, a subframe configuration message sent by a network device, where the subframe configuration message carries a subframe type of a first part of subframes in a target frame, and the first part of subframes refer to specific subframes in a frame; and configuring, by the terminal device, the subframe type of the first part of subframes in the target frame based on the subframe configuration message, so that the terminal device and at least one other terminal device transmit information in a same direction in any subframe of the first part of subframes in the target frame, where the same direction refers to at least one of an uplink direction and a downlink direction.

A fourth aspect provides a terminal device, applied to a TDD communication system. The terminal device includes: a receiving unit and a configuration unit. The receiving unit is configured to receive a subframe configuration message sent by a network device, where the subframe configuration message carries a subframe type of a first part of subframes in a target frame, and the first part of subframes refer to specific subframes in a frame. The configuration unit is configured to configure the subframe type of the first part of subframes in the target frame based on the subframe configuration message, so that the terminal device and at least one other terminal device transmit information in a same direction in any subframe of the first part of subframes in the target frame, where the same direction refers to at least one of an uplink direction and a downlink direction.

In the technical solution provided in any one of the foregoing aspects, the subframe type of the part of subframes (namely, the first part of subframes) in the target frame is configured, so that the at least two terminal devices transmit information in the same direction in any subframe of the first part of subframes. In addition, the common information is transmitted in the first part of subframes. In this way, in the subframe in which any one of the at least two terminal devices transmits the common information, another terminal device can transmit information in the same direction. This resolves a prior-art problem that a receive end (a network device or a terminal device) cannot correctly receive common information, and cannot use the common information transmitted in a subframe for operating, because different terminal devices have opposite information transmission directions in a same subframe, and the common information that is transmitted by one terminal device in the subframe is interfered with by information transmitted in an opposite direction in the subframe by another terminal device.

An embodiment of the present application further provides an implementation solution for configuring a second part of subframes in a target frame. The implementation solution is specifically as follows:

Optionally, the method provided in the first aspect may further include: sending, by the network device, downlink control information to at least one of the at least two terminal devices. Correspondingly, the sending unit in the second aspect may be further configured to send downlink control information to at least one of the at least two terminal devices. In this optional implementation, for the first aspect and the second aspect, the downlink control information sent to one of the terminal devices carries a subframe type that is of the second part of subframes in the target frame and that is configured by the network device for the terminal device, and is used to instruct the terminal device to configure the subframe type of the second part of subframes in the target frame; and the second part of subframes are a part or all of subframes other than the first part of subframes in a frame.

Optionally, the method provided in the third aspect may further include: receiving, by the terminal device, the downlink control information sent by the network device, and configuring the subframe type of the second part of subframes in the target frame based on the downlink control information. Correspondingly, the receiving unit in the fourth aspect is further configured to receive the downlink control information sent by the network device; the configuration unit is further configured to configure the subframe type of the second part of subframes in the target frame based on the downlink control information. In this optional implementation, for the third aspect and the fourth aspect, the downlink control information carries the subframe type that is of the second part of subframes in the target frame and that is configured by the network device for the terminal device, and the second part of subframes are a part or all of subframes other than the first part of subframes in a frame.

An embodiment of the present application further provides an implementation solution for periodically configuring a type of a subframe in a frame. This reduces information interaction between a network device and a terminal device in a process of configuring the subframe and saves bandwidth. The specific implementation solution is as follows:

Optionally, the method provided in the first aspect may further include: sending, by the network device, a message carrying a frame period T to the at least two terminal devices. Correspondingly, the sending unit in the second aspect is further configured to send a message carrying a frame period T to the at least two terminal devices. In this optional implementation, for the first aspect and the second aspect, the message carrying the frame period T is used to instruct the at least two terminal devices to configure, after receiving the subframe configuration message, a first part of subframes in each frame from the target frame to an $nT^{th}$ frame after the target frame, so that the at least two terminal devices transmit information in a same direction in any subframe of the first part of subframes in the each frame; where T is an integer greater than or equal to 1, and n is an integer greater than or equal to 0.

Optionally, the method provided in the third aspect may further include: receiving, by the terminal device, the message that carries the frame period T and that is sent by the network device. In this case, the configuring, by the terminal device, the subframe type of the first part of subframes in the target frame based on the subframe configuration message, so that the terminal device and at least one other terminal device transmit information in a same direction in any subframe of the first part of subframes in the target frame may include: configuring, by the terminal device based on the subframe configuration message and the message that carries the frame period T, a first part of subframes in each frame from the target frame to an $nT^{th}$ frame after the target frame, so that the terminal device and the at least one other terminal device transmit information in a same direction in any subframe of the first part of subframes in the each frame. T is an integer greater than or equal to 1, and n is an integer greater than or equal to 0.

Correspondingly, the receiving unit in the fourth aspect may be further configured to receive a message that carries the frame period T and that is sent by the network device. When configuring the subframe type of the first part of subframes in the target frame based on the subframe configuration message, so that the terminal device and at least one other terminal device transmit information in the same direction in any subframe of the first part of subframes in the target frame, the configuration unit may be specifically configured to configure, based on the subframe configuration message and the message that carries the frame period T, a first part of subframes in each frame from the target frame to an $nT^{th}$ frame after the target frame, so that the terminal device and the at least one other terminal device transmit information in a same direction in any subframe of the first part of subframes in the each frame. T is an integer greater than or equal to 1, and n is an integer greater than or equal to 0.

An embodiment of the present application further provides an implementation solution for configuring different subframes for different network devices. This resolves a problem in which system performance is poor because common information transmitted in a subframe cannot be received by a receive end when a terminal device connected to another network device has a different transmission direction in the same subframe. The specific implementation solution is as follows:

Optionally, the method provided in the first aspect may further include: sending, by the network device, a synchronization configuration message to another network device. Correspondingly, the sending unit in the second aspect may be further configured to send a synchronization configuration message to another network device. In this optional implementation, for the first aspect and the second aspect, the synchronization configuration message carries the subframe type of the first part of subframes in the target frame, so as to instruct the another network device to perform subframe configuration for a terminal device connected to the another network device.

Based on any one of the foregoing technical solutions, an embodiment of the present application further provides an implementation solution for indicating a HARQ. The specific implementation solution is as follows:

Optionally, the method provided in the first aspect may further include: sending, by the network device, downlink control information to at least one of the at least two terminal devices. Correspondingly, the sending unit in the second aspect is further configured to send downlink control information to at least one of the at least two terminal devices. In this optional implementation, for the first aspect and the second aspect, the downlink control information sent to one of the terminal devices carries information about a subframe that is configured by the network device for the terminal device and that indicates a subframe in which uplink feedback of a physical downlink data channel is located, or carries information that is configured by the network device for the terminal device and that indicates a subframe in which downlink feedback of a physical uplink data channel is located.

Optionally, the method provided in the third aspect may further include: receiving, by the terminal device, the downlink control information sent by the network device. Correspondingly, the receiving unit in the fourth aspect may be further configured to receive the downlink control information sent by the network device. In this optional implementation, for the third aspect and the fourth aspect, the downlink control information carries information about a subframe that is configured by the network device for the terminal device and that indicates a subframe in which uplink feedback of a physical downlink data channel is located, or carries information that is configured by the network device for the terminal device and that indicates a subframe in which downlink feedback of a physical uplink data channel is located.

In any one of the foregoing aspects or any one of the foregoing optional implementations in any one of the foregoing aspects, the subframe configuration message may include but is not limited to any one of the following information: a system message, RRC signaling, and downlink control information.

In any one of the foregoing aspects or any one of the foregoing optional implementations, the subframe configuration message specifically carries: a subframe number of the first part of subframes in the target frame and a subframe type corresponding to the subframe number; or information about the first part of subframes in the target frame that are indicated in a bitmap manner and the subframe type of the first part of subframes in the target frame; or a subframe number of the first part of subframes in the target frame, and information, indicated by using a preset quantity of bits, about the subframe type of the first part of subframes in the target frame.

In any one of the foregoing aspects or any one of the foregoing optional implementations, the common information may include at least one of the following information: a synchronization signal and a measurement reference signal.

According to a fifth aspect, an embodiment of the present application provides a network device. The network device has a function of implementing a network device side action in the subframe configuration method provided in the first aspect and the second aspect. The function may be implemented by hardware, or may be implemented by using hardware to execute corresponding software. The hardware or software includes one or more modules corresponding to the foregoing function.

In a possible design, a structure of the network device includes a processor and a transmitter, and the processor is configured to support the network device in executing a corresponding function in the foregoing method. The transmitter is configured to support communication between the network device and a terminal device or another network device. The network device may further include a memory. The memory is coupled to the processor, and is configured to store a program instruction and data that are necessary for the network device.

According to a sixth aspect, an embodiment of the present application provides a terminal device. The terminal device has a function of implementing a terminal device side action in the subframe configuration method provided in the first aspect and the second aspect. The function may be implemented by hardware, or may be implemented by using hardware to execute corresponding software. The hardware or software includes one or more modules corresponding to the foregoing function.

In a possible design, a structure of the terminal device includes a processor and a transmitter, and the processor is configured to support the terminal device in executing a corresponding function in the foregoing method. The transmitter is configured to support communication between the terminal device and a network device. The terminal device may further include a memory. The memory is coupled to the processor, and is configured to store a program instruction and data that are necessary for the terminal device.

An embodiment of the present application further provides a computer storage medium, configured to store a computer software instruction used by the foregoing network device. The computer software instruction includes a program designed for executing the foregoing first aspect.

An embodiment of the present application further provides a computer storage medium, configured to store a computer software instruction used by the foregoing terminal device. The computer software instruction includes a program designed for executing the foregoing second aspect.

An embodiment of the present application further provides a subframe configuration system. The system may include any network device in the foregoing third aspect or fifth aspect, and any terminal device provided in the foregoing fourth aspect or sixth aspect.

DESCRIPTION OF EMBODIMENTS

Figure 1:
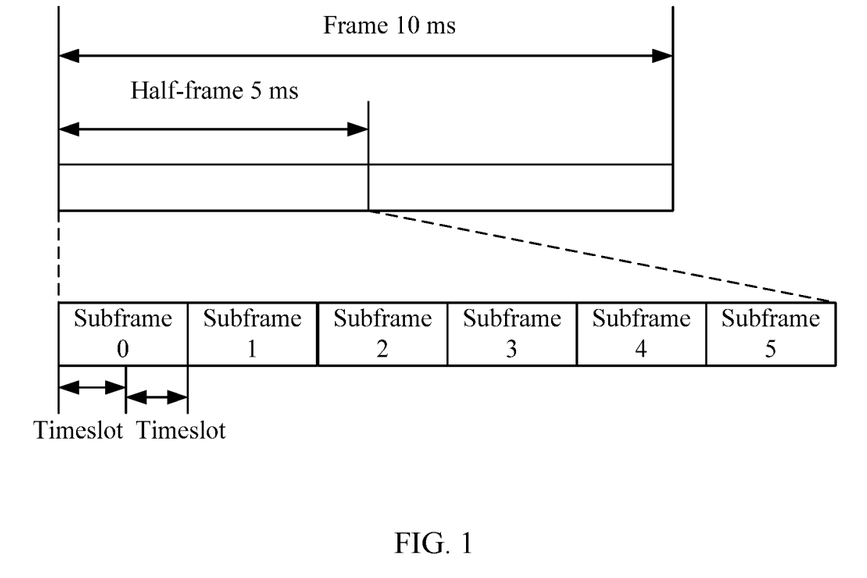
FIG. 1 is a schematic diagram of a frame structure according to an embodiment of the present application.

FIG. 1 shows a structure of a frame (namely, a radio frame). A length of one frame is 10 ms (ms), and the frame consists of two 5-ms half-frames, each half-frame consists of five 1-ms subframes, and each subframe consists of two timeslots. Generally, if a symbol includes an extended cyclic prefix (CP), each timeslot includes six symbols. If a symbol includes a regular CP, each timeslot includes seven symbols.

A subframe type may include: an uplink subframe type (represented by "U"), a downlink subframe type (represented by "D"), and a special subframe type (represented by "S"). The uplink subframe type refers to a type of a subframe used to transmit uplink information, a downlink subframe type refers to a type of a subframe used to transmit downlink information, and a special subframe type refers to a type of a subframe used to transmit uplink information and downlink information. Specifically, a special subframe may include a downlink pilot timeslot (DwPTS), a guard period (GP), and an uplink pilot timeslot (UpPTS). The DwPTS is used for downlink synchronization, the GP is used to reduce interference between downlink and uplink, and the UpPTS is used for uplink synchronization. The special subframe type may include a type (represented as "S1") of a subframe for transmitting downlink information on many symbols and transmitting uplink information on a few symbols, and a type (represented as "S2") of a subframe for transmitting downlink information on a few symbols and transmitting uplink information on many symbols. The uplink information includes uplink data, uplink common information, and the like. The downlink information includes downlink data, downlink common information, and the like.

An uplink (UL) subframe includes a UL part. The UL part may transmit at least one of the following information: uplink data, an uplink HARQ-ACK/NACK feedback corresponding to a previous downlink subframe (that is, a downlink subframe before a current subframe), an uplink reference signal, channel quality indicator (CQI)/channel state information (CSI) of the previous downlink subframe, and a sounding reference signal (SRS) triggered by current subframe control information. The uplink data may be carried on a physical uplink shared channel (PUSCH).

A downlink (DL) subframe includes a DL part. The DL part may transmit at least one of the following information: downlink data, downlink control information, and a downlink reference signal. The downlink data may be carried on a physical downlink shared channel (PDSCH).

The S1 subframe includes a DL part and a UL part. The DL part may transmit at least one of the following information: downlink data, downlink control information, and a downlink reference signal. The downlink data may be carried on a PDSCH. The UL part may transmit at least one of the following information: HARQ-ACK/NACK feedback corresponding to the downlink data, HARQ-ACK/NACK feedback corresponding to a previous subframe (that is, a subframe before a current subframe), CQI/CSI of the current/previous subframe, and an SRS triggered by current subframe control information.

The S2 subframe includes a DL part and a UL part. The DL part may transmit at least one of the following information: PUSCH control information of a current/subsequent subframe (that is, a subframe after the current subframe), downlink feedback of a previous uplink subframe (that is, an uplink subframe before the current subframe), and a downlink reference signal. The UL part may transmit at least one of the following information: uplink HARQ-ACK/NACK feedback on a PUSCH, uplink HARQ-ACK/NACK feedback of a previous downlink subframe, CQI/CSI of a current/previous downlink subframe, and an SRS triggered by current subframe control information.

The technologies described in this specification may be applied to various communication systems, such as current 2G, 3G, 4G communication systems, and future evolved networks, such as 4.5G and 5G communication system, for example, Code Division Multiple Access (CDMA), Wideband Code Division Multiple Access (WCDMA), Time Division Multiple Access (TDMA), Frequency Division Multiple Access (FDMA), Orthogonal Frequency-Division Multiple Access (OFDMA), single-carrier Frequency Division Multiple Access (SC-FDMA), a Long Term Evolution (LTE) system, a wireless-fidelity (WiFi) system, a Worldwide Interoperability for Microwave Access (WiMAX) system, a cellular system related to the Third Generation Partnership Project (3GPP), and other communication systems.

A network device may be a base station, or the like. The base station (for example, an access point) may refer to a device in communication with a wireless terminal by using one or more sectors at an air interface in an access network. The base station may be configured to mutually convert a received over-the-air frame and an IP packet and serve as a router between the wireless terminal and a remaining portion of the access network. The remaining portion of the access network may include an Internet Protocol (IP) network. The base station may also coordinate attribute management of the air interface. For example, the base station may be a base transceiver station (BTS) in GSM or CDMA, or may be a NodeB in WCDMA, or may be an evolved NodeB (eNB, or e-NodeB) in LTE, or may be a base station type in future 3GPP evolvement, such as NR (new radio) in a 5G system. This is not limited in this application.

A basic principle of the technical solution provided by the embodiments of the present application is as follows: A network device performs semi-static configuration on a first part of subframes in a frame. Specifically, the network device configures a subframe type of the first part of subframes in the frame through information exchange between the network device and a terminal device. It should be noted that, as described in the Background part, a basic principle of the technical solution provided in the prior art is: The network device and the terminal device perform configuration according to a subframe type of a first part of subframes that is stipulated in a protocol.

The terms "system" and "network" may be used interchangeably in this specification. The character "/" in this specification generally indicates an "or" relationship between the associated objects. "A plurality of" in this specification means two or at least two.

The following uses an example in which the technical solutions provided in this specification are applied to an LTE system for description. However, a person skilled in the art should understand that the technical solutions may also be applied to another system. In addition, the following uses an example in which the technical solutions provided by the embodiments of the present application are applied to communication between a base station and a terminal device for description. During specific implementation, the technical solutions may be extended to communication between various devices in a 5G standard. The 5G standard includes scenarios such as machine to machine (M2M), D2M, and macro-micro communication. These scenarios may include communication between terminal devices, between base stations, and between a base station and a terminal device, and the like.

The following describes the technical solutions provided in the embodiments of the present application with reference to the accompanying drawings in the embodiments of the present application. Apparently, the described embodiments are a part rather than all of the embodiments of the present application. It should be noted that, some or all of technical features in any of the following technical solutions may be combined if there is no conflict, to form a new technical solution.

Figure 2:
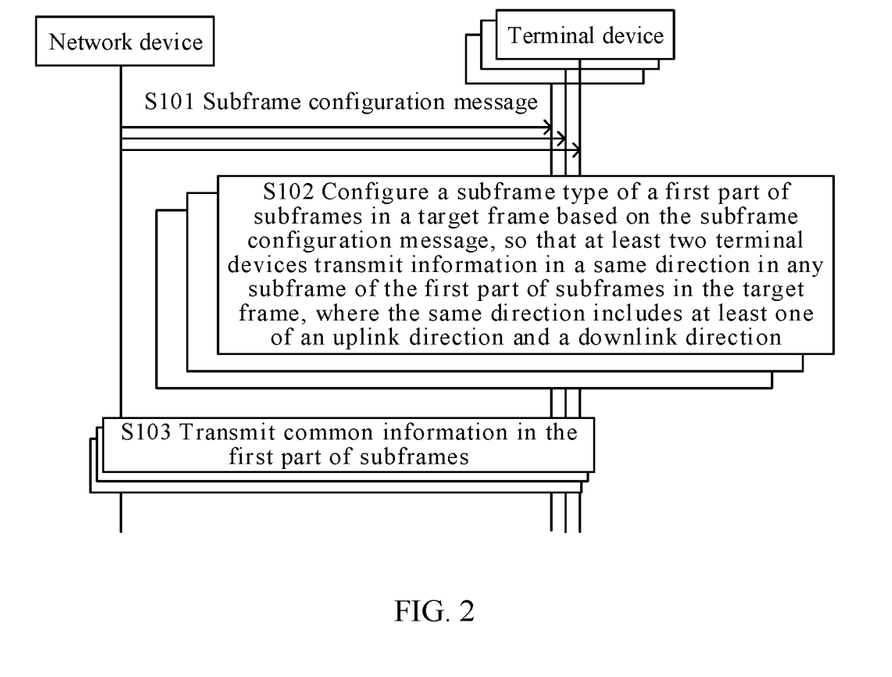
FIG. 2 is a schematic diagram of interaction in a subframe configuration method according to an embodiment of the present application.

As shown in FIG. 2, FIG. 2 is a schematic diagram of a subframe configuration method according to an embodiment of the present application. The method is applied to a TDD communication system and includes steps S101 to S102.

S101: A network device sends a subframe configuration message to at least two terminal devices, where the subframe configuration message carries a subframe type of a first part of subframes in a target frame, and is used to instruct the at least two terminal devices to configure the subframe type of the first part of subframes in the target frame.

This embodiment of the present application does not limit a trigger condition for performing S101 by the network device.

The at least two terminal devices may be two terminal devices in a same cell, or may be two terminal devices in two adjacent cells (for example, two adjacent cells of a same base station or two adjacent cells of different base stations).

specific implementation, first parts of subframes in different frames may be same or different. For example, both a first part of subframes in a frame 1 and a first part of subframes in a frame 2 may be a third subframe and a fourth subframe; a first part of subframes in a frame 3 may be a second subframe and a seventh subframe.

Optionally, if the first part of subframes in the target frame is determined by the network device and the terminal device in advance according to a protocol, and the network device does not need to re-determine the first part of subframes, the subframe configuration message may not carry an identifier of the first part of subframes. If the first part of subframes in the target frame is determined by the network device and the terminal device in advance according to a protocol, and the network device needs to re-determine the first part of subframes, the subframe configuration message may further carry an identifier of the first part of subframes. Alternatively, if the first part of subframes in the target frame is not determined in advance, the subframe configuration message may further carry an identifier of the first part of subframes.

This embodiment of the present application does not limit a subframe type of each subframe in the first part of subframes. During specific implementation, the subframe type may be configured based on an actual application scenario. For example, the first part of subframes may include but is not limited to any one in Table 1. In Table 1, * represents a subframe type of other subframes (including a second part of subframes in the following) other than the first part of subframes, and the subframe type of other subframes may be flexibly configured by a base station based on information, such as a type of a service to be actually transmitted in a network. "D", "U", "S1", and "S2" indicate the subframe type of the first part of subframes.

TABLE 1

| Configuration mode | Subframe 0 | Subframe 1 | Subframe 2 | Subframe 3 | Subframe 4 | Subframe 5 | Subframe 6 | Subframe 7 | Subframe 8 | Subframe 9 |
|---|---|---|---|---|---|---|---|---|---|---|
| Mode 0 | D | * | * | * | * | * | * | * | * | * |
| Mode 1 | S1 | * | * | * | * | * | * | * | * | * |
| Mode 2 | D | U | * | * | * | * | * | * | * | * |
| Mode 3 | S1 | S2 | * | * | * | * | * | * | * | * |

The "target frame" may be any to-be-configured frame after a current frame when the network device performs S101. Optionally, the subframe configuration message may further include an identifier of the target frame. The identifier of the target frame may be a frame number of the target frame, or the like.

The "first part of subframes" refers to a part of subframes in one frame (generally referred to as "frame"), and are specifically specific subframes in one frame. A quantity of subframes in the first part of subframes and the locations of the subframes are not limited in this embodiment of the present application, and may be configured based on an actual application scenario (for example, a type of a to-be-transmitted service, interference strength, or the like) during specific implementation. To be specific, which subframes in one frame are used as the first part of subframes may be determined based on an actual scenario. A location of a subframe refers to a location of a subframe in a frame in which the subframe is located (for example, a third subframe, a fourth subframe, and the like), and may be marked by using a subframe number (for example, a subframe 2, a subframe 3, and the like). It should be noted that, during S102: Each terminal device receives the subframe configuration message sent by the network device, and configures the subframe type of the first part of subframes in the target frame based on the subframe configuration message, so that the at least two terminal devices transmit information in a same direction in any subframe of the first part of subframes in the target frame, where the same direction includes at least one of an uplink direction and a downlink direction.

Specifically, if the terminal device has configured the subframe type of the first part of subframes in the target frame according to a protocol, in S102, the terminal device may reconfigure the subframe type of the first part of subframes in the target frame based on the subframe configuration message. Optionally, the terminal device may further re-determine the first part of subframes in the target frame based on the subframe configuration message. If the terminal device has not configured the subframe type of the first part of subframes in the target frame, in S102, the terminal device may directly configure the subframe type of the first part of subframes in the target frame based on the subframe configuration message.

For example, if the information carried in the subframe configuration message is the mode 0 in Table 1, each of the at least two terminal devices configures the subframe type of the first part of subframes in the target frame according to the mode 0 in Table 1.

In any subframe of the first part of subframes in the target frame, all terminal devices transmit information in a same direction. For example, in the mode 0 of Table 1, at least two terminal devices perform downlink transmission in a subframe 0. For another example, in the mode 1 of Table 1, the at least two terminal devices may transmit downlink information in the first 12 symbols of the subframe 0 (assuming that there are a total of 14 symbols), and transmit uplink information in the last two symbols. For another example, in the mode 2 of Table 1, the at least two terminal devices transmit downlink information in the subframe 0, and transmit uplink information in the subframe 1. An example of S2 in the mode 3 is similar to this, and details are not described herein again. The transmitted information may include at least one of data, system information, and control information.

S103: The network device transmits common information in the first part of subframes.

Specifically, the network device may transmit uplink common information in an uplink subframe of the first part of subframes. For example, the base station receives, in the uplink subframe of the first part of subframes, uplink common information sent by at least one of the at least two terminal devices. Alternatively, the network device transmits downlink common information in a downlink subframe of the first part of subframes. For example, the base station sends downlink common information to at least one of the at least two terminal devices in the downlink subframe of the first part of subframes.

Optionally, during specific implementation, the first part of subframes may be further used to transmit other information. For example, the network device transmits uplink data in an uplink subframe of the first part of subframes, transmits downlink data in a downlink subframe of the first part of subframes, and transmits uplink and downlink data in a special subframe.

Optionally, the common information may include but is not limited to one or more of the following information: a synchronization signal, a measurement reference signal, physical random access channel (PRACH) information, physical broadcast channel (PBCH) information, and the like. The synchronization signal includes a primary synchronization signal or a secondary synchronization signal. The measurement reference signal refers to a signal used to measure signal performance (for example, signal strength, signal quality, and interference strength on a signal) of a terminal device. The measurement reference signal includes but is not limited to: a cell reference signal (CRS), an SRS, and the like.

It should be noted that, during specific implementation, the network device may further transmit information other than the common information in the first part of subframes.

In the subframe configuration method provided in this embodiment of the present application, a subframe type of a part of subframes (namely, the first part of subframes) in the target frame is configured, so that the at least two terminal devices transmit information in a same direction in any subframe of the first part of subframes. In addition, the common information is transmitted in the first part of subframes. In this way, in the subframe in which any one of the at least two terminal devices transmits the common information, another terminal device can transmit information in the same direction. This resolves a prior-art problem that a receive end (a network device or a terminal device) cannot correctly receive common information, and cannot use the common information transmitted in a subframe for operating, because different terminal devices have opposite information transmission directions in a same subframe, and the common information that is transmitted by one terminal device in the subframe is interfered with by information transmitted in an opposite direction in the subframe by another terminal device.

Optionally, steps S101 to S102 may be replaced with the following steps S1 to S2:

S1: A network device sends a subframe configuration message to all terminal devices in a cluster, where the subframe configuration message carries a subframe type of a first part of subframes in a target frame, and is used to instruct all the terminal devices to configure the subframe type of the first part of subframes in the target frame.

S2: Each terminal device receives the subframe configuration message sent by the network device, and configures the subframe type of the first part of subframes in the target frame based on the subframe configuration message, so that all the terminal devices transmit information in a same direction in any subframe of the first part of subframes in the target frame, where the same direction includes at least one of an uplink direction and a downlink direction.

One cluster includes one or more cells. For a specific implementation of dividing cells of a base station into clusters, refer to the prior art. In this case, the network device configures a same subframe type of any subframe in the first part of subframes for all terminal devices in a same cluster, and configures a same subframe type or different subframe types of any subframe in the first part of subframes for terminal devices in different clusters. The network device configures a same subframe type or different subframe types of any subframe in a second part of subframes for different terminal devices.

Figure 3:
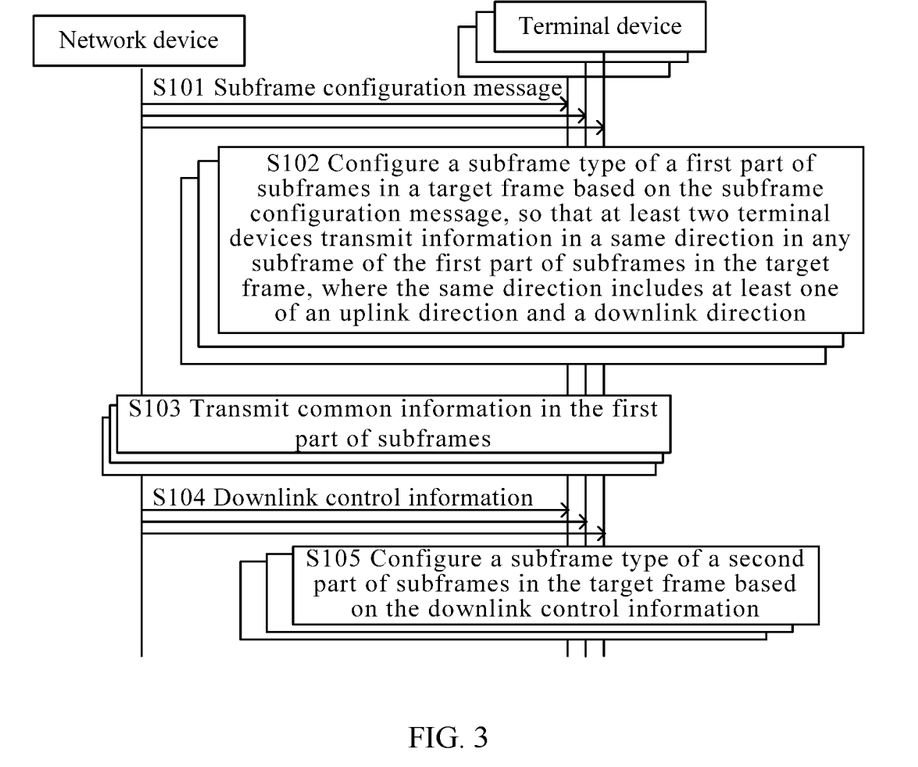
FIG. 3 is a schematic diagram of interaction in another subframe configuration method according to an embodiment of the present application.

Steps S101 to S103 provide a method for configuring the subframe type of the first part of subframes in the target frame. The method may further include configuring a subframe type for a subframe other than the first part of subframes in the target frame. Specifically, as shown in FIG. 3, the method may further include the following steps S104 to S105:

S104: The network device sends downlink control information to at least one of the at least two terminal devices, where the downlink control information sent to one of the terminal devices carries a subframe type of a second part of subframes in the target frame configured by the network device for the terminal device, and is used to instruct the terminal device to configure the subframe type of the second part of subframes in the target frame.

S105: Each terminal device receives the downlink control information sent by the network device, and configures the subframe type of the second part of subframes in the target frame based on the downlink control information.

Specifically, for each terminal device, the network device may send the downlink control information once or multiple times, so that one or more pieces of downlink control information carries or carry the subframe type, configured for the terminal device, of the second part of subframes in the target frame. The second part of subframes may be a part or all of subframes other than the first part of subframes in a frame. The following uses an example of all subframes other than the first part of subframes in a frame for description. The downlink control information in S105 may be replaced with other signaling at an L1 layer or signaling at an L2 layer (namely, a MAC layer).

It should be noted that, during specific implementation, the downlink control information in S104 is usually at a TTI level. To be specific, the network device sends the downlink control information every one or more TTIs.

It should also be noted that, in theory, the network device may first perform steps S101 to S103 and then steps S104 to S105, or may first perform steps S104 to S105 and then steps S101 to S103, or may perform steps S101 to S103 and steps S104 to S105 at the same time. Actually, the subframe type is configured based on a cell level in steps S101 to S103, and the subframe type is configured based on a terminal device level in steps S104 to S105. Therefore, preferably the network device first performs steps S101 to S103 and then performs steps S104 to S105.

Optionally, S101 may include: sending, by the network device, a system message, radio resource control (RRC) signaling, or downlink control information to the at least two terminal devices. The system message may be a master information block (MIB) message or a system information block (SIB) message. It should be noted that, if the subframe configuration message is the downlink control information, the downlink control information may be downlink control information at a frame level (for example, one or more frames), that is, the network device sends the downlink control information every one or more frames, but not the downlink control information at the TTI level.

Correspondingly, S102 may include: receiving, by each terminal device, the system message, the RRC signaling, or the downlink control information sent by the network device.

Optionally, the subframe configuration message may specifically carry but is not limited to any one of the following information combinations:

Combination 1: a subframe number of the first part of subframes in the target frame and a subframe type corresponding to the subframe number. Optionally, the subframe configuration message may further carry a quantity of subframes in the first part of subframes (namely, the first part of subframes).

For example, formats of information carried in the subframe configuration message may include but are not limited to:

a quantity n of a first part of subframes;
first part of subframes 1: a subframe number x1, a subframe type y1;
first part of subframes 2: a subframe number x2, a subframe type y2;
. . .
first part of subframes n: a subframe number xn, a subframe type yn.

The mode 0 in Table 1 is used as an example. The information carried in the subframe configuration message may be: a quantity 1 of a first part of subframes; a first part of subframes 1: a subframe 0, D. The mode 3 in Table 1 is used as an example. The information carried in the subframe configuration message may be: a quantity 2 of a first part of subframes; a first part of subframes 1: a subframe 0, S1; a first part of subframes 2: subframe 1, S2.

Combination 2: information about the first part of subframes in the target frame that are indicated in a bitmap manner and the subframe type of the first part of subframes in the target frame. In this optional method, the subframe type may include but is not limited to being carried in the subframe configuration message in a list form.

For example, it is assumed that 1 indicates the first part of subframes (namely, the first part of subframes), and 0 indicates the second part of subframes (namely, the second part of subframes). The mode 0 in Table 1 is used as an example. The information carried in the subframe configuration message may be: 1000000000, D. The mode 3 in Table 1 is used as an example. The information carried in the subframe configuration message may be: 1100000000, S1, and S2.

Combination 3: a subframe number of the first part of subframes in the target frame, and information, indicated by using a preset quantity of bits, about the subframe type of the first part of subframes in the target frame.

For example, because one frame includes 10 subframes, four bits may be used to represent a subframe number in one frame, and it is assumed that 10 subframe numbers in one frame are respectively represented by 0000-1010.00 indicates D, 01 indicates U, 10 indicates S1, and 11 indicates S2. The mode 0 in Table 1 is used as an example. The information carried in the subframe configuration message may be: 0000, 00. The mode 3 in Table 1 is used as an example. The information carried in the subframe configuration message may be: 0000, 0001, 10, 11.

It should be noted that, the foregoing example uses two bits to represent all possible subframe types. During specific implementation, the network device may further determine, based on a total quantity of subframe types of all subframes included in the frame, a quantity, that is, a preset quantity, of bits that indicate the subframe type. For example, the mode 0 in Table 1 is used as an example. Because there is one type of first part of subframes, if * includes two types U and D, the total quantity is 2, and the preset quantity is 1.

Similar to the combination 3, if the second part of subframes are all subframes other than the first part of subframes in a frame, the subframe configuration message may further specifically carry a subframe number of the second part of subframes in the target frame and information, indicated by using a preset quantity of bits, about the subframe type of the first part of subframes in the target frame. This optional manner is particularly applicable to a scenario in which a quantity of the first part of subframes (namely, the first part of subframes) is greater than a quantity of the second part of subframes (including the second part of subframes). For a specific example, refer to the specific example of the foregoing combination 3, and details are not described herein again.

The foregoing describes how the network device configures the subframe type of the first part of subframes in a frame. Optionally, the subframe type of the first part of subframes may be configured periodically. Specifically, the method may further include:

S100: The network device sends a message carrying a frame period T to the at least two terminal devices, so as to instruct all the terminal devices to configure, after receiving the subframe configuration message, a first part of subframes in each frame from the target frame to an nT$^{th}$ frame after the target frame, where T is an integer greater than or equal to 1, and n is an integer greater than or equal to 1.

In this case, S102 specifically includes: configuring, by each terminal device after receiving the subframe configuration message, a first part of subframes in each frame from the target frame to an nT$^{th}$ frame after the target frame, so that all the terminal devices transmit information in a same direction in any subframe of the first part of subframes in the each frame.

The message carrying the frame period may be a same message as the subframe configuration message in S101, or may be two separate messages. Preferably, the two are the same message. For example, the message may be a system message, RRC signaling, downlink control information, or the like.

For example, if the target frame is a frame 1 and T=5, one frame period starting from the target frame is specifically: the frame 1, a frame 6, a frame 11, and a frame 16 . . . . In any subframe of the first part of subframes in each frame, all the terminals transmit information in a same direction. Based on the foregoing example, a subframe type of a second subframe of each of the frame 1, frame 6, frame 11, and frame 16 . . . is U and a subframe type of a third subframe is D.

It should be noted that a subframe type of a first part of subframes in a non-$nT^{th}$ frame in any one or more frame periods may be same as or different from a subframe type of a first part of subframes in an $nT^{th}$ frame in each frame period. For example, based on the foregoing example, a subframe type of a second subframe in a frame 2 may be U, and a subframe type of a third subframe may be S1, or the like.

This optional implementation can reduce information exchange between the network device and the terminal device and therefore can save bandwidth.

Optionally, the method may further include: sending, by the network device, a synchronization configuration message to another network device, where the synchronization configuration message carries the subframe type of the first part of subframes in the target frame, so as to instruct the another network device to perform subframe configuration for a terminal device connected to the another network device.

The another network device generally refers to one or more network devices adjacent to the network device. In this optional implementation, a plurality of network devices may negotiate, for example, a base station actively sends a synchronization configuration message to a neighboring base station, or sends a synchronization configuration message to the neighboring base station at a request of the neighboring base station. Then, the neighboring base station may perform, based on the synchronization configuration message, subframe configuration for a terminal device connected to the neighboring base station.

This optional implementation may resolve a problem in which system performance is poor because common information transmitted in a subframe cannot be received by a receive end when a terminal device connected to an adjacent network device has a different transmission direction in the same subframe.

Optionally, based on the foregoing provided subframe configuration method, an embodiment of the present application further provides a method for indicating a hybrid automatic repeat request (HARQ). The method is specifically as follows:

For a downlink HARQ time sequence, optionally, the method may further include: sending, by the network device, the downlink control information to the at least one of the at least two terminal devices, where the downlink control information sent to one of the terminal devices carries information about a subframe that is configured by the network device for the terminal device and that indicates a subframe (namely, an uplink feedback subframe) in which uplink feedback of a physical downlink data channel is located. Specifically, the information may be an identifier (for example, a subframe number, or an index) of the indicated subframe, or may be an offset relative to a subframe, or the like. For example, the information may be a subframe n, and in this case, the uplink feedback subframe is the subframe n. The information may be an offset k relative to a current downlink subframe m, and in this case, the uplink feedback subframe is a subframe m+k.

For an uplink HARQ time sequence, optionally, the method may further include: sending, by the network device, the downlink control information to the at least one of the at least two terminal devices, where the downlink control information sent to one of the terminal devices carries information about a subframe that is configured by the network device for the terminal device and that indicates a subframe (namely, a downlink feedback subframe) in which downlink feedback of a physical uplink data channel is located. Specifically, the information may be an identifier (for example, a subframe number or an index) of the indicated subframe, or may be an offset relative to a subframe, or the like. For example, the information may be a subframe n, and in this case, the downlink feedback subframe is the subframe n. The information may be an offset k relative to a current downlink subframe m, and in this case, the downlink feedback subframe is a subframe m+k.

The following describes an apparatus embodiment corresponding to the method embodiment of the present application described above. It should be noted that, for explanations of related content in the following apparatus embodiment, refer to the foregoing method embodiment.

Figure 4:
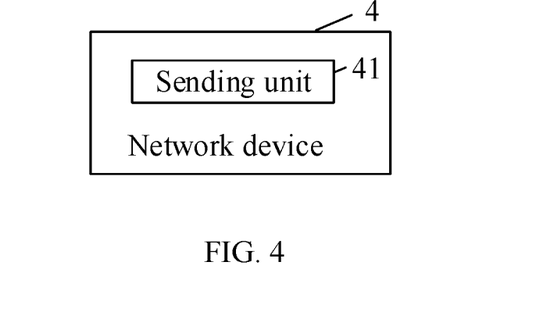
FIG. 4 is a schematic diagram of a structure of a network device according to an embodiment of the present application.

As shown in FIG. 4, FIG. 4 is a schematic diagram of a structure of a network device according to an embodiment of the present application. A network device 4 shown in FIG. 4 is applied to a TDD communication system, and is configured to perform an action of a network device side in the method shown in FIG. 2 or FIG. 3. The network device 4 may include a module corresponding to a corresponding step. For example, the network device may include a sending unit 41.

The sending unit 41 is configured to send a subframe configuration message to at least two terminal devices. The subframe configuration message carries a subframe type of a first part of subframes in a target frame, and is used to instruct the at least two terminal devices to configure the subframe type of the first part of subframes in the target frame, so that the at least two terminal devices transmit information in a same direction in any subframe of the first part of subframes in the target frame. The same direction includes at least one of an uplink direction and a downlink direction. The first part of subframes refer to specific subframes in a frame, and the first part of subframes in the target frame are used to transmit common information.

Optionally, the sending unit 41 is further configured to send downlink control information to at least one of the at least two terminal devices. The downlink control information sent to one of the terminal devices carries a subframe type that is of a second part of subframes in the target frame and that is configured by the network device 4 for the terminal device, and is used to instruct the terminal device to configure the subframe type of the second part of subframes in the target frame. The second part of subframes are a part or all of subframes other than the first part of subframes in a frame.

Optionally, when sending the subframe configuration message to the at least two terminal devices, the sending unit 41 may specifically be configured to send a system message, radio resource control RRC signaling, or downlink control information to the at least two terminal devices.

Optionally, the subframe configuration message specifically carries: a subframe number of the first part of subframes in the target frame and a subframe type corresponding to the subframe number; or information about the first part of subframes in the target frame that are indicated in a bitmap manner and the subframe type of the first part of subframes in the target frame; or a subframe number of the first part of subframes in the target frame, and information, indicated by using a preset quantity of bits, about the subframe type of the first part of subframes in the target frame.

Optionally, the sending unit 41 may be further configured to send a message carrying a frame period T to the at least two terminal devices, so as to instruct the at least two terminal devices to configure, after receiving the subframe configuration message, a first part of subframes in each frame from the target frame to an $nT^{th}$ frame after the target frame, so that the at least two terminal devices transmit information in a same direction in any subframe of the first part of subframes in the each frame; where T is an integer greater than or equal to 1, and n is an integer greater than or equal to 0.

Optionally, the sending unit 41 may be further configured to send a synchronization configuration message to another network device. The synchronization configuration message carries the subframe type of the first part of subframes in the target frame, so as to instruct the another network device to perform subframe configuration for a terminal device connected to the another network device.

Optionally, the sending unit 41 may be further configured to send the downlink control information to the at least one of the at least two terminal devices. The downlink control information sent to one of the terminal devices carries information about a subframe that is configured by the network device 4 for the terminal device and that indicates a subframe in which uplink feedback of a physical downlink data channel is located, or carries information that is configured by the network device 4 for the terminal device and that indicates a subframe in which downlink feedback of a physical uplink data channel is located.

Optionally, the common information includes at least one of a synchronization signal and a measurement reference signal.

During hardware implementation, the sending unit 41 may be a transmitter. During specific implementation, the network device 4 may further include a receiver. The transmitter and the receiver may be integrated to constitute a transceiver. Programs corresponding to actions executed by the network device may be stored in a memory of the network device 4 in a software form, so that a processor invokes the programs and performs operations corresponding to the foregoing modules.

Figure 5:
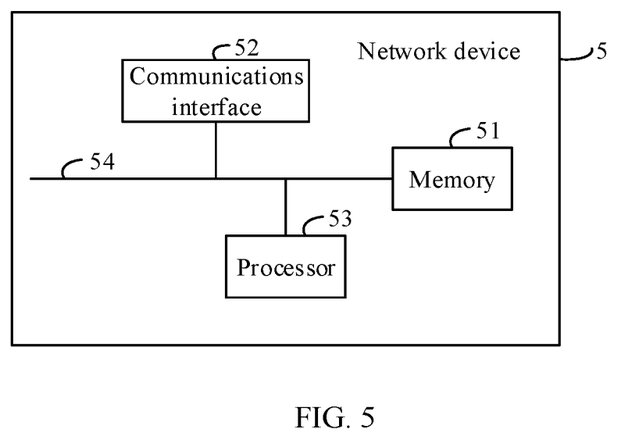
FIG. 5 is a schematic diagram of a structure of another network device according to an embodiment of the present application.

As shown in FIG. 5, FIG. 5 is a schematic diagram of a structure of a network device according to an embodiment of the present application. A network device 5 shown in FIG. 5 is applied to a TDD communication system, and is configured to perform an action of a network device in any one of the foregoing methods. The network device 5 may include a memory 51, a communications interface 52, a processor 53, and a system bus 54. The communications interface 52 and the processor 53 are connected by using the system bus 54.

The memory 51 is configured to store a computer execution instruction. When the network device 5 runs, the processor 53 executes the computer execution instruction stored in the memory 51, so that the network device 5 executes an action of the network device in the embodiment provided in FIG. 2 or FIG. 3. Specifically, for the action executed by the network device, refer to the foregoing related description, and details are not described herein again.

In a specific implementation process, steps in the method process shown in FIG. 2 or FIG. 3 may be implemented by using the processor 53 in a hardware form to execute the computer execution instruction in a software form stored in the memory 51. To avoid repetition, details are not described herein again.

An embodiment further provides a storage medium. The storage medium may include a memory 51.

The network device 4 and the network device 5 provided in the embodiments of the present application may be configured to execute an action executed by the network device in the schematic diagram of interaction in the method shown in FIG. 2 or FIG. 3. For technical effects that can be achieved in the embodiments of the present application, refer to the foregoing method embodiment. Details are not described herein again.

Figure 6:
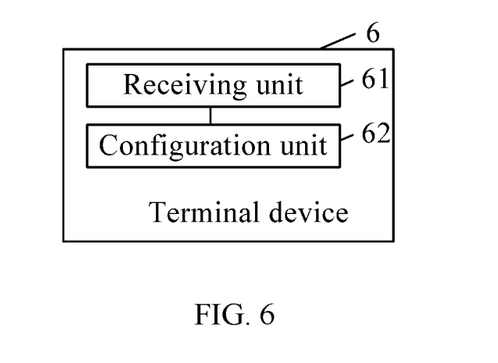
FIG. 6 is a schematic diagram of a structure of a terminal device according to an embodiment of the present application.

As shown in FIG. 6, FIG. 6 is a schematic diagram of a structure of a terminal device according to an embodiment of the present application. A terminal device 6 shown in FIG. 6 is applied to a TDD communication system, and is configured to perform an action of a terminal device side in the method shown in FIG. 2 or FIG. 3. The terminal device 6 may include a module corresponding to a corresponding step. For example, the terminal device may include a receiving unit 61 and a configuration unit 62.

The receiving unit 61 is configured to receive a subframe configuration message sent by a network device. The subframe configuration message carries a subframe type of a first part of subframes in a target frame, and the first part of subframes refer to specific subframes in a frame.

The configuration unit 62 is configured to configure the subframe type of the first part of subframes in the target frame based on the subframe configuration message, so that the terminal device 6 and at least one other terminal device transmit information in a same direction in any subframe of the first part of subframes in the target frame. The same direction refers to at least one of an uplink direction and a downlink direction.

Optionally, the receiving unit 61 may be further configured to receive downlink control information sent by the network device. The downlink control information carries a subframe type that is of a second part of subframes in the target frame and that is configured by the network device for the terminal device 6, and the second part of subframes refer to a part or all of subframes other than the first part of subframes in a frame. In this case, the configuration unit 62 is further configured to configure the subframe type of the second part of subframes in the target frame based on the downlink control information.

Optionally, when receiving the subframe configuration message sent by the network device, the receiving unit 61 may be specifically configured to receive a system message, radio resource control RRC signaling, or downlink control information sent by the network device.

Optionally, the subframe configuration message may specifically carry: a subframe number of the first part of subframes in the target frame and a subframe type corresponding to the subframe number; or information about the first part of subframes in the target frame that are indicated in a bitmap manner and the subframe type of the first part of subframes in the target frame; or a subframe number of the first part of subframes in the target frame, and information, indicated by using a preset quantity of bits, about the subframe type of the first part of subframes in the target frame.

Optionally, the receiving unit 61 may be further configured to receive a message that carries a frame period T and that is sent by the network device. In this case, when configuring the subframe type of the first part of subframes in the target frame based on the subframe configuration message, so that the terminal device 6 and at least one other terminal device transmit information in the same direction in any subframe of the first part of subframes in the target frame, the configuration unit 62 may be specifically configured to configure, based on the subframe configuration message and the message that carries the frame period T, a first part of subframes in each frame from the target frame to an $nT^{th}$ frame after the target frame, so that the terminal device 6 and the at least one other terminal device transmit information in a same direction in any subframe of the first part of subframes in the each frame. T is an integer greater than or equal to 1, and n is an integer greater than or equal to 0.

Optionally, the receiving unit 61 may be further configured to receive the downlink control information sent by the network device. The downlink control information carries information about a subframe that is configured by the network device for the terminal device 6 and that indicates a subframe in which uplink feedback of a physical downlink data channel is located, or carries information that is configured by the network device for the terminal device 6 and that indicates a subframe in which downlink feedback of a physical uplink data channel is located.

Optionally, the common information includes at least one of the following information: a synchronization signal and a measurement reference signal.

During hardware implementation, the receiving unit 61 may be a receiver. During specific implementation, the terminal device 6 may further include a transmitter. The transmitter and the receiver may be integrated to constitute a transceiver. The configuration unit 62 may be embedded in or disposed independent of a processor of the terminal device 6 in a hardware form, or may be stored in a memory of the terminal device 6 in a software form, so that the processor invokes and performs operations corresponding to the foregoing modules.

Figure 7:
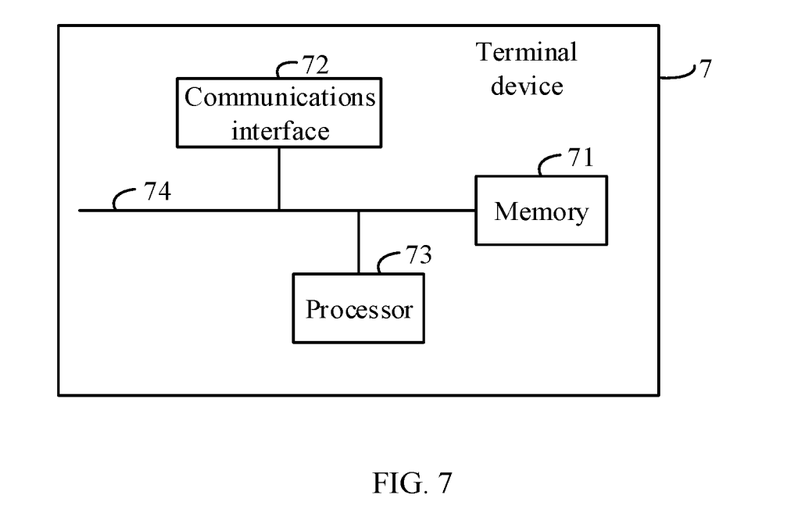
FIG. 7 is a schematic diagram of a structure of another terminal device according to an embodiment of the present application.

As shown in FIG. 7, FIG. 7 is a schematic diagram of a structure of a terminal device according to an embodiment of the present application. A terminal device 7 shown in FIG. 7 is applied to a TDD communication system, and is configured to perform an action of a terminal device in any one of the foregoing methods. The terminal device 7 may include a memory 71, a communications interface 72, a processor 73, and a system bus 74. The communications interface 72 and the processor 73 are connected by using the system bus 74.

The memory 71 is configured to store a computer execution instruction. When the terminal device 7 runs, the processor 73 executes the computer execution instruction stored in the memory 71, so that the terminal device 7 executes an action of the terminal device in the embodiment provided in FIG. 2 or FIG. 3. Specifically, for the action executed by the terminal device, refer to the foregoing related description, and details are not described herein again.

In a specific implementation process, steps in the method process shown in FIG. 2 or FIG. 3 may be implemented by using the processor 73 in a hardware form to execute the computer execution instruction in a software form stored in the memory 71. To avoid repetition, details are not described herein again.

An embodiment further provides a storage medium. The storage medium may include a memory 71.

The terminal device 6 and the terminal device 7 provided in the embodiments of the present application may be configured to execute an action executed by the terminal device in the schematic diagram of interaction in the method shown in FIG. 2 or FIG. 3. For technical effects that can be achieved in the embodiments of the present application, refer to the foregoing method embodiment. Details are not described herein again.

It should be noted that the processor in any one of the network devices or terminal devices may be a processor, or may be a general term of a plurality of processing units. For example, the processor 53 may be a central processing unit (CPU), or may be another general-purpose processor, a digital signal processor (DSP), an application-specific integrated circuit (ASIC), a field-programmable gate array (FPGA) or another programmable logic device, a discrete gate or a transistor logic device, a discrete hardware component, or the like. The general-purpose processor may be a microprocessor. Alternatively, the processor may be any conventional processor or the like, or may be a dedicated processor. The dedicated processor may include at least one of a baseband processing chip, a radio frequency processing chip, and the like. Further, the dedicated processor may further include a chip with another dedicated processing function in a device (for example, the network device or the terminal device) in which the processor is located.

The memory in any one of the network devices or terminal devices may include a volatile memory, for example, a random access memory (RAM); the memory may include a non-volatile memory, for example, a read-only memory (ROM), a flash memory, a hard disk drive (HDD), or a solid-state drive (SSD); or the memory may include a combination of the foregoing types of memories.

The system bus in any one of the network devices or terminal devices may include a data bus, a power bus, a control bus, a signal status bus, and the like. In this embodiment, for clarity of description, various buses are marked as the system bus.

The communications interface in any one of the network devices or terminal devices may be specifically a transceiver. The transceiver may be a wireless transceiver. For example, the wireless transceiver may be an antenna or the like. The processor communicates with another device by using the communications interface.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present application may be integrated into one processing unit, or each of the units may exist alone physically, or two or more units are integrated into one unit. The integrated unit may be implemented in a form of hardware, or may be implemented in a form of hardware in addition to a software functional unit.

Finally, it should be noted that the foregoing embodiments are merely intended for describing the technical solutions of the present application but not for limiting the present application. Although the present application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present application.

What is claimed is:

1. A method performed by a base station for communication with multiple terminal devices in a time division duplex (TDD) mode, comprising:
   sending a radio resource control (RRC) message carrying system information to the multiple terminal devices, the system information including system level configuration information which comprises an identifier of a target frame and a frame period T to designate a first group of subframes in every frame of a plurality of frames as being of a first subframe type, the plurality of frames comprising the target frame and frames at nT after the target frame, wherein T is an integer greater than 1, and n is a variable with an integer value greater than or equal to 1; and
   sending downlink control information to a first terminal device of the multiple terminal devices, the downlink control information designating a second group of subframes in each frame of one or more frames of the plurality of frames as being of a second subframe type, wherein each of the first and second subframe types is uplink, downlink, or special.

2. The method according to claim 1, wherein the method further comprises:
   communicating, by the base station, a synchronization signal, a measurement reference signal or a physical random access signal with the multiple terminal devices by the first group of subframes.

3. A method performed by a terminal device for communication with a base station in a time division duplex (TDD) mode, comprising:
   receiving a radio resource control (RRC) message carrying system information, the system information including system level configuration information which comprises an identifier of a target frame and a frame period T to designate a first group of subframes in every frame of a plurality of frames as being of a first subframe type, the plurality of frames comprising the target frame and frames at nT after the target frame, wherein T is an integer greater than 1, and n is a variable with an integer value greater than or equal to 1;
   configuring the first group of subframes in every frame of the plurality of frames to be of the first subframe type;
   receiving downlink control information, the downlink control information designating a second group of subframes in each frame of one or more frames of the plurality of frames as being of a second subframe type; and
   configuring the second group of subframes in said each frame to be of the second subframe type,
   wherein each of the first and second subframe types is uplink, downlink, or special.

4. The method according to claim 3, wherein the method further comprises:
   communicating, by the terminal device, a synchronization signal, a measurement reference signal or a physical random access signal with the base station by the first group of subframes.

5. A base station for communication with multiple terminal devices in a time division duplex (TDD) mode, comprising:
   a memory storing instructions; and
   a processor coupled to the memory to execute the instructions to:
   send a radio resource control (RRC) message carrying system information to the multiple terminal devices, the system information including system level configuration information which comprises an identifier of a target frame and a frame period T to designate a first group of subframes in every frame of a plurality of frames as being of a first subframe type, the plurality of frames comprising the target frame and frames at nT after the target frame, wherein T is an integer greater than 1, and n is a variable with an integer value greater than or equal to 1; and
   send downlink control information to a first terminal device of the multiple terminal devices, the downlink control information designating a second group of subframes in each frame of one or more frames of the plurality of frames as being of a second subframe type, wherein each of the first and second subframe types is uplink, downlink, or special.

6. The base station according to claim 5, wherein the processor is further configured to:
   communicate a synchronization signal, a measurement reference signal or a physical random access signal with the multiple terminal devices by the first group of subframes.

7. A terminal device for communication with a base station in a time division duplex (TDD) mode, comprising:
   a memory storing instructions; and
   a processor coupled to the memory to execute the instructions to:
   receive a radio resource control (RRC) message carrying system information, the system information including system level configuration information which comprises an identifier of a target frame and a frame period T to designate a first group of subframes in every frame of a plurality of frames as being of a first subframe type, the plurality of frames comprising the target frame and frames at nT after the target frame, wherein T is an integer greater than 1, and n is a variable with an integer value greater than or equal to 1;
   configure the first group of subframes in every frame of the plurality of frames to be of the first subframe type;

receive downlink control information, the downlink control information designating a second group of subframes in each frame of one or more frames of the plurality of frames as being of a second subframe type; and configure the second group of subframes in said each frame to be of the second subframe type, wherein each of the first and second subframe types is uplink, downlink, or special.

8. The terminal device according to claim 7, wherein the processor is further configured to:

communicate a synchronization signal, a measurement reference signal or a physical random access signal with the base station by the first group of subframes.

* * * * *